US011243789B2

(12) United States Patent
Wang et al.

(10) Patent No.: US 11,243,789 B2
(45) Date of Patent: Feb. 8, 2022

(54) SYSTEMS, METHODS, AND APPARATUS THAT PROVIDE MULTI-FUNCTIONAL LINKS FOR INTERACTING WITH AN ASSISTANT AGENT

(71) Applicant: Google LLC, Mountain View, CA (US)

(72) Inventors: Mingling Wang, San Jose, CA (US); Ye Zhou, London (GB); Dina Elhaddad, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/122,720

(22) Filed: Dec. 15, 2020

(65) Prior Publication Data

US 2021/0096890 A1 Apr. 1, 2021

Related U.S. Application Data

(63) Continuation of application No. 15/835,835, filed on Dec. 8, 2017, now Pat. No. 10,896,050.

(Continued)

(51) Int. Cl.
*G06F 9/451* (2018.01)
*G06F 3/0482* (2013.01)
(Continued)

(52) U.S. Cl.
CPC ............ *G06F 9/453* (2018.02); *G06F 3/0482* (2013.01); *G06F 8/61* (2013.01); *G06F 9/445* (2013.01);
(Continued)

(58) Field of Classification Search
CPC .. G06F 16/90332; G06F 9/453; G06F 9/4451; G06F 9/445; G06F 8/61;
(Continued)

(56) References Cited

U.S. PATENT DOCUMENTS 9,410,815 B1\* 8/2016 Hirano ............... G01C 21/3407
2004/0172455 A1\* 9/2004 Green ..................... H04L 51/24
709/207

(Continued)

FOREIGN PATENT DOCUMENTS

WO 2011088053 7/2011

OTHER PUBLICATIONS

Kar, R. et al., "Applying Chatbots to the Internet of Things: Opportunities and Architectural Elements"; International Journal of Advanced Computer Science and Applications, vol. 7, No. 11, pp. 147-154; Jul. 1, 2016 Jul. 1, 2016.

(Continued)

*Primary Examiner* — Seth A Silverman
(74) *Attorney, Agent, or Firm* — Middleton Reutlinger

(57) ABSTRACT

Methods, apparatus, systems, and computer-readable media are provided for introducing a user to functions of various applications through interactions with an assistant agent. The assistant agent can correspond to an assistant application that can provide a user interface with multiple selectable elements, each of which can correspond to a separate application. When a user selects one of the selectable elements, a function of an application can be demonstrated to the user, in order that the user might become more familiar with functions of the application. In some implementations, a portion of the selectable element can be selected to cause information about the application to be presented to the user. This allows the user to have the option to try out or learn about an application before investing computational resources through downloading and installing the entire application.

15 Claims, 7 Drawing Sheets

Related U.S. Application Data

(60) Provisional application No. 62/567,733, filed on Oct. 3, 2017.

(51) Int. Cl.
| | |
|---|---|
| H04W 4/38 | (2018.01) |
| G06F 16/9032 | (2019.01) |
| G06F 9/445 | (2018.01) |
| G06F 8/61 | (2018.01) |
| H04W 4/33 | (2018.01) |
| H04W 4/70 | (2018.01) |
| G06F 40/10 | (2020.01) |
| G06F 40/35 | (2020.01) |
| G06F 40/40 | (2020.01) |
| H04M 1/72403 | (2021.01) |
| H04M 1/72454 | (2021.01) |
| H04M 1/72469 | (2021.01) |
| G06F 3/0481 | (2022.01) |

(52) U.S. Cl.
CPC ...... *G06F 9/4451* (2013.01); *G06F 16/90332* (2019.01); *G06F 40/10* (2020.01); *G06F 40/35* (2020.01); *G06F 40/40* (2020.01); *H04M 1/72403* (2021.01); *H04M 1/72454* (2021.01); *H04M 1/72469* (2021.01); *H04W 4/33* (2018.02); *H04W 4/38* (2018.02); *H04W 4/70* (2018.02); *G06F 3/04817* (2013.01)

(58) Field of Classification Search
CPC .......... G06F 40/10; G06F 40/35; G06F 40/40; G06F 3/0482; G06F 3/04817; H04W 4/38; H04W 4/33; H04W 4/70; H04M 1/72522; H04M 1/72569; H04M 1/72583
See application file for complete search history.

(56) References Cited

U.S. PATENT DOCUMENTS

| | | | | |
|---|---|---|---|---|
| 2011/0314375 | A1* | 12/2011 | Zaika | G06F 3/0482 715/708 |
| 2012/0265528 | A1* | 10/2012 | Gruber | G10L 15/183 704/235 |
| 2016/0098988 | A1* | 4/2016 | Goussard | G10L 15/1822 704/257 |
| 2018/0108349 | A1* | 4/2018 | Hutchings | G06F 40/20 |
| 2018/0267774 | A1* | 9/2018 | Williams | G06F 3/167 |

OTHER PUBLICATIONS

Baby, C. et al., "Home Automation Using IoT and a Chatbot Using Natural Language Processing", 2017 Innovations in Power and Advanced Computing Technologies (I-PACT), IEEE, pp. 1-6; Apr. 21, 2017 Apr. 21, 2017.

Furquan, A. et al., "Learnability through Adaptive Discovery Tools in Voice User Interfaces", Human Factors in Computing Systems, ACM, pp. 1617-1623; May 6, 2017 May 6, 2017.

Sun, M. et al., "An Intelligent Assistant for High-Level Task Understanding", Intelligent User Interfaces, ACM, pp. 169-174, Mar. 7, 2016 Mar. 7, 2016.

European Patent Office, International Search Report and Written Opinion of PCT Ser No. PCT/US2018/054120; 23 pages; dated Feb. 20, 2019 Feb. 20, 2019.

European Patent Office; Communication pursuant to Article 94(3) EPC issued in EP Application No. 1875955.8; 10 pages; dated Dec. 9, 2021.

* cited by examiner

SYSTEMS, METHODS, AND APPARATUS THAT PROVIDE MULTI-FUNCTIONAL LINKS FOR INTERACTING WITH AN ASSISTANT AGENT

BACKGROUND

Humans may engage in human-to-computer dialogs with interactive software applications referred to herein as "automated assistants" (also referred to as "digital agents," "chatbots," "interactive personal assistants," "assistant agents," "intelligent personal assistants," "conversational agents," etc.). For example, humans (which when they interact with automated assistants may be referred to as "users") may interact with automated assistants by providing commands using spoken natural language input (i.e., utterances) which may in some cases be converted into text and then processed, and/or by providing textual (e.g., typed) natural language input. Some automated assistants allow users to control certain peripheral devices through spoken inputs, however, some users may not be aware that other applications can also be used to control the peripheral devices. Furthermore, a user may not want to waste computational resources downloading and installing applications that they are not familiar with and do not know how to operate. Although some automated assistants can provide search query results to a user about certain applications, a user may still desire to experience certain functions of an application without having to take the time to download and install the entire application.

SUMMARY

This disclosure relates to systems, methods, and apparatus for introducing a user to functions of various applications through interactions with an assistant agent. This can allow a user to become familiar with functions of the applications without causing computational resources to be consumed through searching for information about the functions and applications. While interacting with a computing device, such as a cellular phone, tablet computer, a television, and/or any other type of computing device, a user can open an assistant agent application. The assistant agent can provide a home page or landing page that includes a field for receiving commands from the user. The home page can also include an icon for opening a user interface with multiple selectable elements, and each selectable element can correspond to a different application that is accessible to the assistant agent.

Each selectable element provided at the user interface can include a first selectable portion and a second selectable portion. When the first selectable portion is selected by a user, the assistant agent can cause a corresponding application to perform a function of the application. For instance, the first selectable portion can include text that describes a command that the user can provide to the assistant agent to cause the assistant agent to interact with the application for performing a particular action. When the second selectable portion is selected by the user, the assistant agent can cause application information to be presented to the user. The application information can be related to application functions, ratings, links to websites, availability of the application, compatibility of the application, and/or any other information that can be associated with an application or a device. In some implementations, the application information presented to the user can include other selectable elements that, when selected, cause the assistant agent to interact with the application to perform different actions.

In some implementations, the selectable element can include a first selectable portion that, when selected, causes a lite version of an application to be installed at the computing device and/or a separate computing device that is accessible to the assistant agent. A lite version of an application can require less disc space or memory to install than a non-lite version of the application. Alternatively, the lite version of the application can include less functionality or available operations than a non-lite version of the application. For example, the assistant agent can identify multiple different devices that are associated with one or more accounts of a user. An account can be stored at a server device that manages a database of entries, and at least one of the entries can identify one or more devices owned by the user. The assistant agent can use the entries to identify devices such as appliances, computers, automobiles, accessories, and/or any other apparatuses that can be controlled by an assistant application. The assistant agent can also identify applications that are associated with the identified devices, and present selectable elements that correspond to the applications.

In some implementations, selecting any portion of the selectable element can invoke the application that is identified by the selectable element or otherwise corresponds to the selectable element. In some implementations, in response to a selection of the selectable element, a conversation session between the application and the user can be initialized with the assistant agent acting as an intermediary between the application and the user. The conversation session can be invoked based on a command phrase identified at the selectable element. For example, the command phrase can be provided to the application or the assistant agent. The assistant agent can process the command phrase and/or generate a structured command corresponding to the command phrase. The structured command can then be provided to the application to cause the application to perform one or more actions corresponding to the structured command.

As an example, the assistant agent can identify a device, such as a smart light bulb (e.g., a light bulb that is connected to a WiFi network) and search for an application that is capable of controlling the device. The assistant agent can then generate a selectable element that identifies that identifies the application (i.e., an IoT application) and includes a first selectable portion and a second selectable portion. The first selectable portion can include text that describes or is otherwise associated with an action that can be performed by the IoT application. For instance, the text can include "Lower the brightness of the smart light bulbs in my home." In response to the user selecting the first selectable portion of the selectable element, the assistant agent can transmit a request or command to the IoT application and/or the smart light bulb to cause the smart light bulb to lower its brightness level. In response to the user selecting the second selectable portion, the assistant agent can generate a query that is transmitted over the internet or other network in order to identify information related to the IoT application. The identified information can include additional commands and/or other application details that can be presented to the user. The identified information can then be presented at a user interface, in order to encourage the user to further interact with the assistant agent and/or the IoT application. In some implementations, the action(s) performed in response to the user selecting the first selectable portion can include downloading a lite version of the IoT application in order to demonstrate one or more functions of the IoT application. Additionally, when the second selectable portion is selected by the user, a link to download a non-lite version, or full version, of the IoT application can be presented to the user. In this way, the user is able to more conveniently try out functions of an application through an assistant interface, without having to download an entire application and waste time and resources searching for information on how to use the application.

The above description is provided as an overview of some implementations of the disclosure. Additional description of those, and other, implementations is provided herein.

In some implementations, a method implemented by one or more processors is set forth as including steps such as receiving a selection of a first selectable element displayed at a first user interface of a computing device. The first user interface can be provided by an assistant agent that is accessible to the computing device. The method can also include steps of generating a command phrase associated with an application that is accessible to the computing device, and causing the assistant agent to provide a second user interface that includes multiple selectable elements associated with multiple different applications accessible to the computing device. A given selectable element, of the multiple selectable elements, can be specific to the application and include (i) a first selectable portion that includes text corresponding to the command phrase for controlling the assistant agent and (ii) a second selectable portion for accessing additional information associated with the application. When the first selectable portion is selected, the steps can include causing the assistant agent to initiate a conversation session with the application based on the command phrase, receiving responsive content from the application, and causing the responsive content to be graphically presented in a dialog interface provided by the assistant agent. When the second selectable portion is selected, the steps can include causing a third user interface to be displayed at the computing device. The third user interface can identify the additional information associated with the application.

In some implementations, the command phrase can be generated based on a historical interaction between a user and the assistant agent. When the second selectable portion is selected, the assistant agent can bypass transmitting the command phrase to the application. The command phrase can be identified at the third user interface with other command phrases. The dialog interface can include additional selectable elements corresponding to different command phrases that can be employed to control the application. The application can be configured to control a peripheral device and the command phrase, when received at the application, can cause the application to adjust a setting of the peripheral device. The peripheral device can be separate from the computing device and connected to a network to which the computing device is connected.

In other implementations, a system is set forth as including one or more processors, and memory configured to store instructions that, when executed by one or more processors, cause the one or more processors to perform steps that include: identifying one or more devices that are connected to an agent assistant that is accessible to the one or more processors. The agent assistant can be configured to control one or more settings of the one or more devices. The steps can further include determining one or more command phrases that are available for controlling the identified one or more devices via the agent assistant. The one or more command phrases, when provided to the agent assistant, can cause the agent assistant to perform one or more actions. The steps can further include causing multiple different selectable elements to be presented at a user interface of a display device. A selectable element of the multiple different selectable elements can correspond to a device application associated with a device of the identified one or more devices, and the selectable element can include a first selectable portion that includes (i) text identifying a command phrase of the one or more command phrases and (ii) a second selectable portion. When the first selectable portion is selected, the steps can include causing the device to perform an operation according the identified command phrase. When the second selectable portion is selected, the steps can include providing information related to the device application at the user interface and bypassing causing the device to perform the operation. When the second selectable portion is selected, the information can be presented at a separate user interface that includes other selectable elements. The other selectable elements can correspond to command phrases that cause the device to perform different operations when selected. When the first selectable portion is selected, the user interface can be updated to include a different selectable element corresponding to a different command phrase. The operation can include displaying content at a display of the device. The multiple different selectable elements can correspond to different applications and include separate text identifying different command phrases for controlling the different applications.

In yet other implementations, a non-transitory computer-readable medium is set forth as storing instructions that, when executed by one or more processors, cause the one or more processors to perform steps that include: causing a user interface to be presented at a display device of a computing device. The user interface can include multiple different selectable elements corresponding to multiple different applications accessible to an assistant agent. A selectable element of the multiple different selectable elements can identify an application of the multiple different application and includes a selectable portion. The steps can also include generating a command phrase corresponding to the application. The command phrase can correspond to an action that is performed at a separate computing device in response to a selection of the selectable element. When the selection of the selectable portion is received, the steps can include causing the separate computing device to perform the action, wherein the action includes providing a physical response that is perceivable by a user, and causing the display device of the computing device to present information associated with the application. The information can include a supplemental command phrase that corresponds to a different action that is performed by the application at the separate computing device. The separate device can include a separate display device and the physical response can correspond to an output presented at the separate display device. The output can correspond to content that is retrieved by the separate computing device. The command phrase can be processed by the assistant agent in response to the selection of the selectable portion. The assistant agent can cause the separate computing device to perform the action in response to the selection of the selectable portion. The assistant agent can correspond to an assistant application that is hosted as device that is different than the computing device and the separate computing device. The assistant application can be accessible to each of the computing device and the separate computing device.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
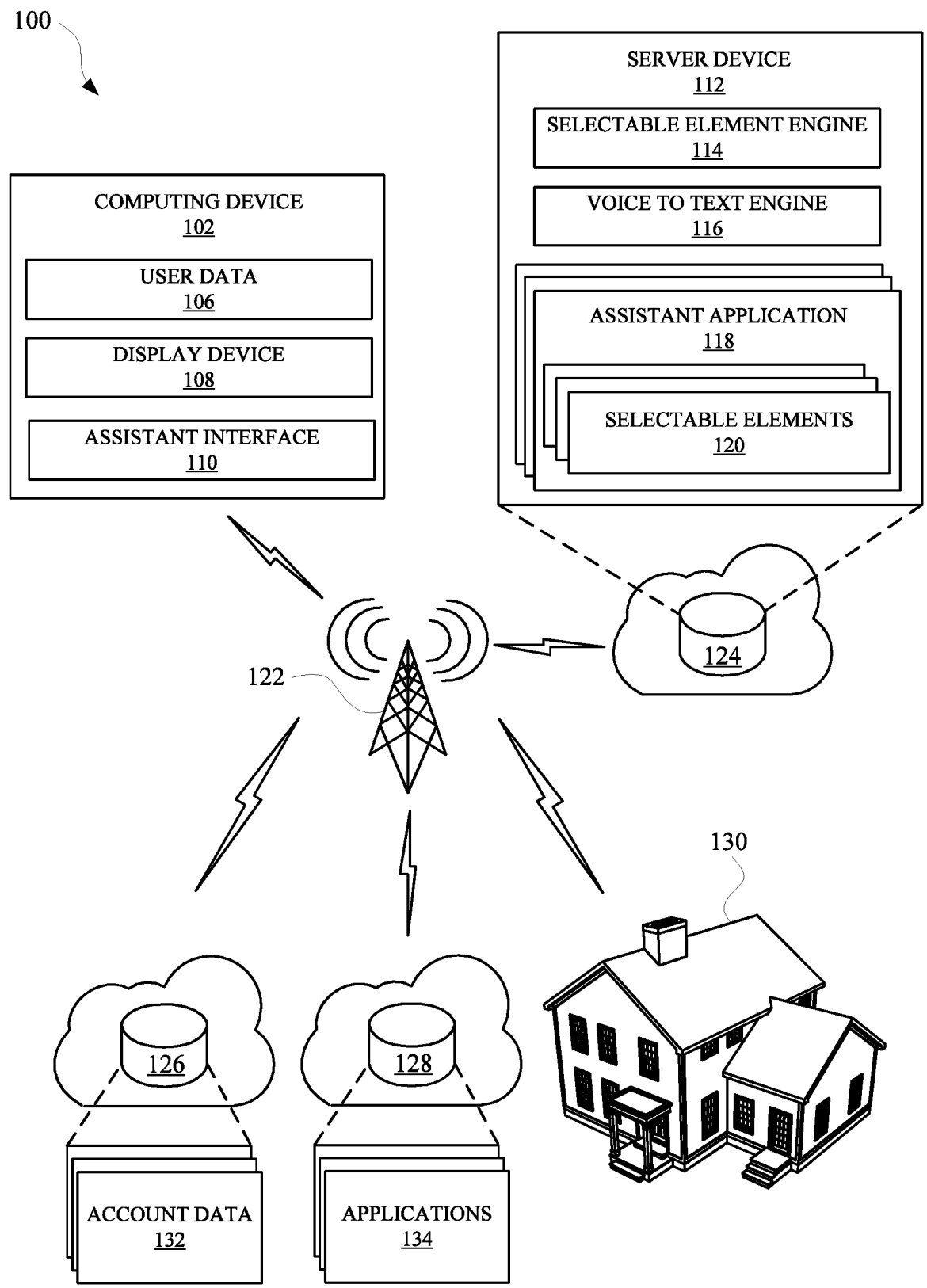
FIG. 1 illustrates a system for providing an assistant agent capable of providing multi-functional selectable elements for introducing a user to operations available from various applications.

FIG. 1 illustrates a system 100 for providing an assistant agent capable of providing multi-functional selectable elements for introducing a user to operations available from various applications. The assistant agent can operate as part of an assistant application 118 that is provided at a computing device 102 or a remote device 124, such as a server device 112. A user can interact with the assistant agent via an assistant interface 110, which can be a microphone, a camera, a touch screen display, a user interface, and/or any other apparatus capable of providing an interface between a user and an application. For instance, a user can initialize the assistant agent by providing a verbal, textual, or a graphical input to the assistant interface 110 to cause the assistant agent to perform a function (e.g., provide data, control a peripheral device, access a separate agent, etc.). The computing device 102 can include a display device 108, which can be a display panel that includes a touch interface for receiving touch inputs and/or gestures for allowing a user to control applications of the computing device 102 via the touch interface.

Although a single computing device 102 is illustrated in FIG. 1, in various implementations multiple computing devices can interface with the assistant application 118 in performing various techniques disclosed herein. For example, multiple different selectable elements 120 can be provided to the assistant interface 110 of the computing device 102, and responsive data can be audibly and/or graphically presented at a separate computing device in response to a selection of at least one selectable element 120. The separate computing device can be linked to or paired with the computing device 102. For example, the separate computing device can be linked to the computing device 102 based on the same user account being utilized at both computing devices, based on both computing devices being connected to the same secured network, based on both computing devices being in direct peer-to-peer communication with one another, etc. As another example, a selectable element can cause the assistant application 118 to transmit command(s) that cause the state of one or more peripheral devices (e.g., IoT devices) to be altered. For instance, a selection of a selectable element can cause a command to be transmitted from an IoT device application to a networked "smart" light, which can cause the light to turn on or off, alter its lumen output, alter its light output color, etc. Also, for instance, a selection of a selectable element can cause an IoT device application to transmit a command that causes a "smart" thermostat to alter a set temperature of a heating or cooling system of a home 130, turn a heating or cooling system on or off, etc. Also, for instance, a selection of a selectable element 120 can additionally or alternatively cause a command to be transmitted from an IoT device application to a networked "smart" garage door opener at the home 130 and cause a garage door to open or close.

The computing device 102 can be in communication with the remote device 124 over a network 122, such as the internet. The computing device 102 can offload computational tasks to the server device 112 in order to conserve computational resources at the computing device 102. For instance, the server device 112 can host the assistant application 118 and the computing device 102 can transmit inputs received at the assistant interface 110 to the server device 112. However, in some implementations, the assistant application 118 can be hosted at the computing device 102. In various implementations, all or less than all aspects of the assistant application 118 can be implemented on the computing device 102. In some of those implementations, aspects of the assistant application 118 are implemented via a local assistant application of the computing device 102 and interface with the server device 112 that implements other aspects of the assistant. The server device 112 can optionally serve a plurality of users and their associated assistant applications via multiple threads. In implementations where all or less than all aspects of the assistant application 118 are implemented via local assistant application of the computing device 102, the local assistant application can be an application that is separate from an operating system of the computing device 102 (e.g., installed "on top" of the operating system)—or can alternatively be implemented directly by the operating system of the computing device 102 (e.g., considered an application of, but integral with, the operating system).

In some implementations, the server device 112 can include a voice to text engine 116 that can process audio data received at the assistant interface 110 to identify the text embodied in the audio data. The process for converting the audio data to text can include a speech recognition algorithm, which can employ neural networks and/or statistical models for identifying groups of audio data corresponding to words or phrases. The text converted from the audio data can be available to the assistant application 118 as textual data that can be used to generate and/or identify command phrases.

In some implementations, a user can interact with an assistant agent through the assistant interface 110 and cause the assistant agent to present a user interface that includes multiple different selectable elements. Each of the selectable elements can correspond to a separate application that is accessible to the computing device 102, the server device 112, the assistant application 118, and/or any other device that can be associated with a user. In some implementations, the server device 112 can include a selectable element engine 114 for generating the selectable elements 120 based on user data 106, account data 132, and/or any other data that can be available to the assistant application 118. For example, the user data 106 can correspond to browser data generated and/or stored by the computing device 102 as the user is browsing the internet from their computing device 102. The user data 106 can include an entry that indicates that the user has been searching for movies to watch. The selectable element engine 114 can compare the user data 106 to other data, such as account data 132 available at a remote device 126 over the network 122.

The selectable element engine 114 can determine, from the account data 132, that the user owns a television, and/or that a television is connected in the home 130 of the user. The selectable element engine 114 can use the correlation between the user data 106 (e.g., the movie search history) and the account data 132 (e.g., the user owns a television) to generate a selectable element 120 to present at the display device 108. For example, the selectable element 120 can include a first selectable portion that includes text such as, "Show me my recently searched movies on my television." The user can select the first selectable portion of the selectable element 120 to cause the assistant agent to present the recently searched movies at the television in the home 130. Alternatively, the user can select a second selectable portion of the selectable element 120 to cause the assistant agent to present information related to features of the assistant agent. For instance, the assistant agent can cause a separate user interface to open at the computing device 102 and display various selectable commands for interacting with the assistant agent. The selectable commands can include commands that can be based on the user data 106 data such as, for example, commands that can cause the assistant agent to interact with the television or present information that includes browser search history data.

Figure 2A:
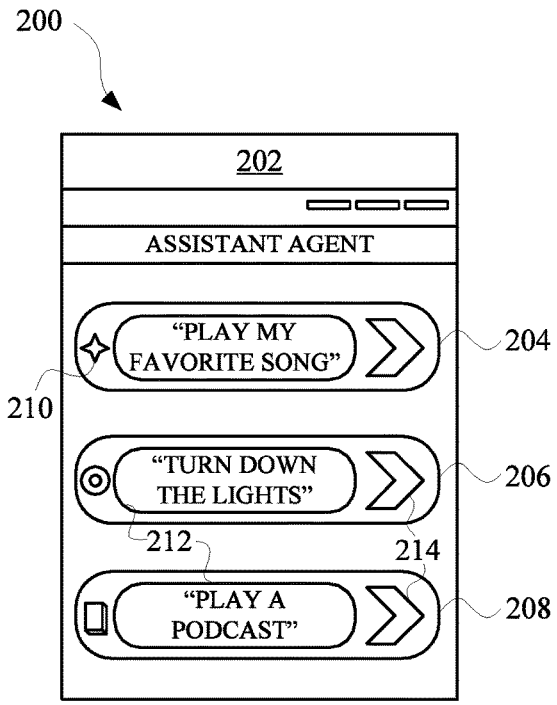
FIGS. 2A, 2B, and 2C illustrate an assistant agent providing selectable elements for controlling multiple different applications and/or receiving more information about the applications.
Figure 2B:
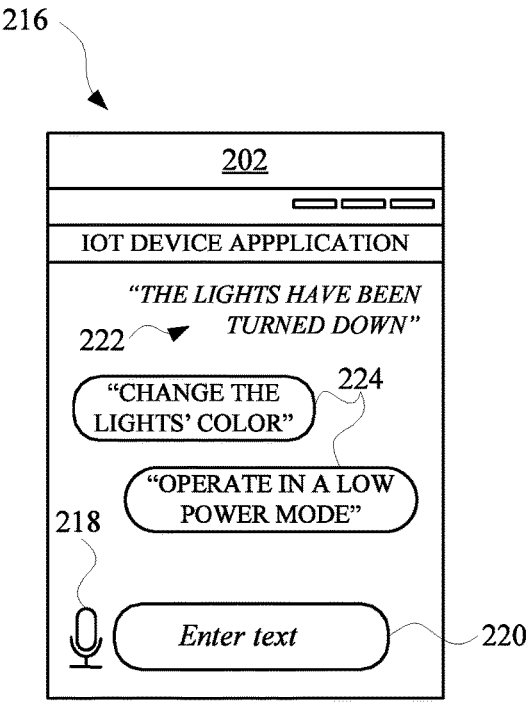
Figure 2C:
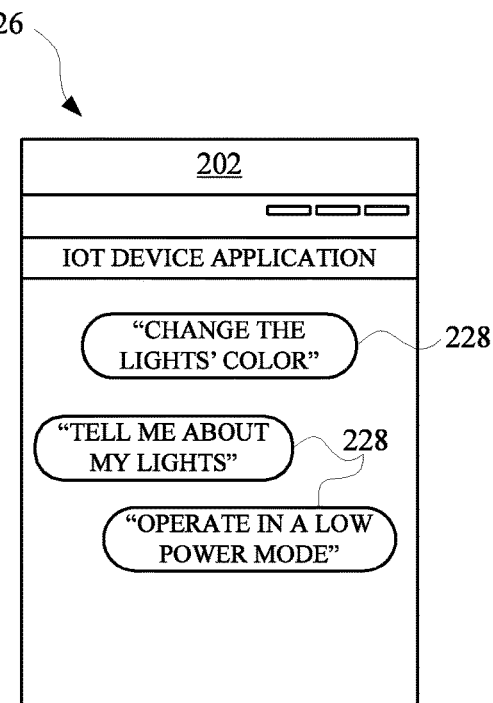

FIGS. 2A-2C illustrate an assistant agent providing selectable elements for controlling multiple different applications and/or receiving more information about the applications. The user interfaces can be presented at a computing device in response to a selection made at the computing device. FIG. 2A can correspond to a first user interface 200 provided at a display 202 of the computing device. The first user interface 200 can include multiple different selectable elements 204, 206, and 208 for controlling different applications and/or devices. Each of the different selectable elements can include application icons 210 for identifying the applications to which the selectable elements 204, 206, and 208 correspond. Each of the selectable elements can also include text that identifies or describes a command that can be provided by a user to an assistant agent to cause a corresponding application to perform an action. For instance, the selectable element 206 can correspond to an IoT device application and the text provided at the selectable element 206 can include the phrase "Turn down the lights." The phrase can correspond to a command that, when spoken by a user to an assistant interface of the computing device, can cause the assistant agent to interact with the IoT device application and cause the IoT device application to perform an action. The text can be provided at a first selectable portion 212 of the selectable element, and when the first selectable portion 212 is selected by the user, the assistant agent can act to cause the action to be performed.

The selectable elements 204, 206, and 208 can also include a second selectable portion 214. The second selectable portion 214 can, when selected by the user, cause the assistant agent to provide additional information about an application that is associated with the selectable element. For instance, when the second selectable portion 214 of the selectable element 206 is selected by the user, the assistant agent can retrieve information about the corresponding application (e.g., the IoT device application) and present the retrieved information at a separate user interface.

FIG. 2B illustrates a second user interface 216 that can be provided to a user at a computing device in response to the user selecting a first selectable portion 212 of a selectable element 206. The second user interface 216 can provide an indication 222 (e.g., "The lights have been turned down") that an action has been performed, via the IoT device application, in response to the user selecting the first selectable portion 212. The IoT device application can be loaded onto the computing device or be otherwise accessible to the assistant agent. For instance, the IoT device application can be one that the user has not yet installed on their computing device, but is nonetheless able to try various functions of the IoT device application (e.g., by installing a lite version using the assistant agent). In some implementations, the second user interface 216 can provide additional command recommendations 224 for controlling the IoT device application. Furthermore, the second user interface 216 can include an interface icon 218 and/or a field 220, to indicate that the user can provide spoken or typed commands to the assistant agent to cause the assistant agent to control the IoT device application. For example, the user can speak one of the additional commands recommended at the second user interface 216 (e.g., "change the lights' color") and, in response, the assistant agent can provide the command to the IoT device application. The IoT device application can then perform an action (e.g., change an output color of the lights) in response to receiving the command from the assistant agent.

In some implementations, by selecting the first selectable portion 212 or the second selectable portion 214, the assistant agent can cause a dialog interface to open and the command phrase, identified in the first selectable portion 212, to be received by the assistant agent. The assistant agent can thereafter cause the application, corresponding to the selectable element, to perform an action associated with the command phrase. The dialog interface can include a field 220 for the assistant agent to receive other commands from the user. For instance, the user can speak a command to the computing device and the spoken command can be converted to text that is then provided to the assistant agent. The assistant agent can then interact with the application to cause the application to perform an action associated with the spoken command. In this way, the user is able to have a dialog with the assistant agent that ultimately allows the user to figure out how to operate a particular application.

FIG. 2C illustrates a third user interface 226 that can be provided at the computing device 202 when the user selects the second selectable portion 214 of the selectable element 206. The third user interface 226 can include additional information about the application that is identified at the selectable element 206. For instance, the third user interface 226 can identify supplemental commands 228 for interacting with the IoT device application. In some implementations, the third user interface 226 can provide supplemental commands 228 for retrieving additional information about the IoT device application. For instance, a supplemental command 228 can include, for example, "operate in a low power mode," which when spoken by a user can cause the assistant agent to provide a command to the IoT device application for causing one or more devices in a home of the user to operate in a low power mode. Alternatively, the user can select the selectable element corresponding to the command "tell me about my lights" in order cause the assistant agent to retrieve information about any lights associated with the user (e.g., associated with an account of the user). The assistant agent can then present the information at the display of the computing device 202 and/or provide an audio output to the user describing the information retrieved about the lights.

In some implementations, when the user selects the first selectable portion 212 or the second selectable portion 214, the assistant agent can retrieve information about the application corresponding to the selected selectable element. For instance, the information can include a version of the application, compatibility of the application, ratings and/or comments made by other users of the application, shortcuts and/or links to other information or commands for the application, settings for the application, and/or any other information that can be associated with the application.

In some implementations, the second selectable portion 214 can be a chat icon that, when selected, causes the second user interface 216 to appear at the computing device. Additionally, in response to selecting the chat icon, the command phrase identified in the first selectable portion 212 can be received by the assistant agent, and the assistant agent can cause the application to perform an action associated with the command phrase. Furthermore, when a user selects any other portion of the selectable element, besides the chat icon, the third user interface 226 can appear at the computing device. The third user interface 226 can provide the user with command recommendations and/or additional information about the application. Furthermore, the third user interface 226 can include a link for downloading the application or otherwise trying out the application, and/or a link for entering the dialog interface for chatting with the assistant agent about the application. In this way, the user will be able to request specific information about the application from the assistant agent.

Figure 3:
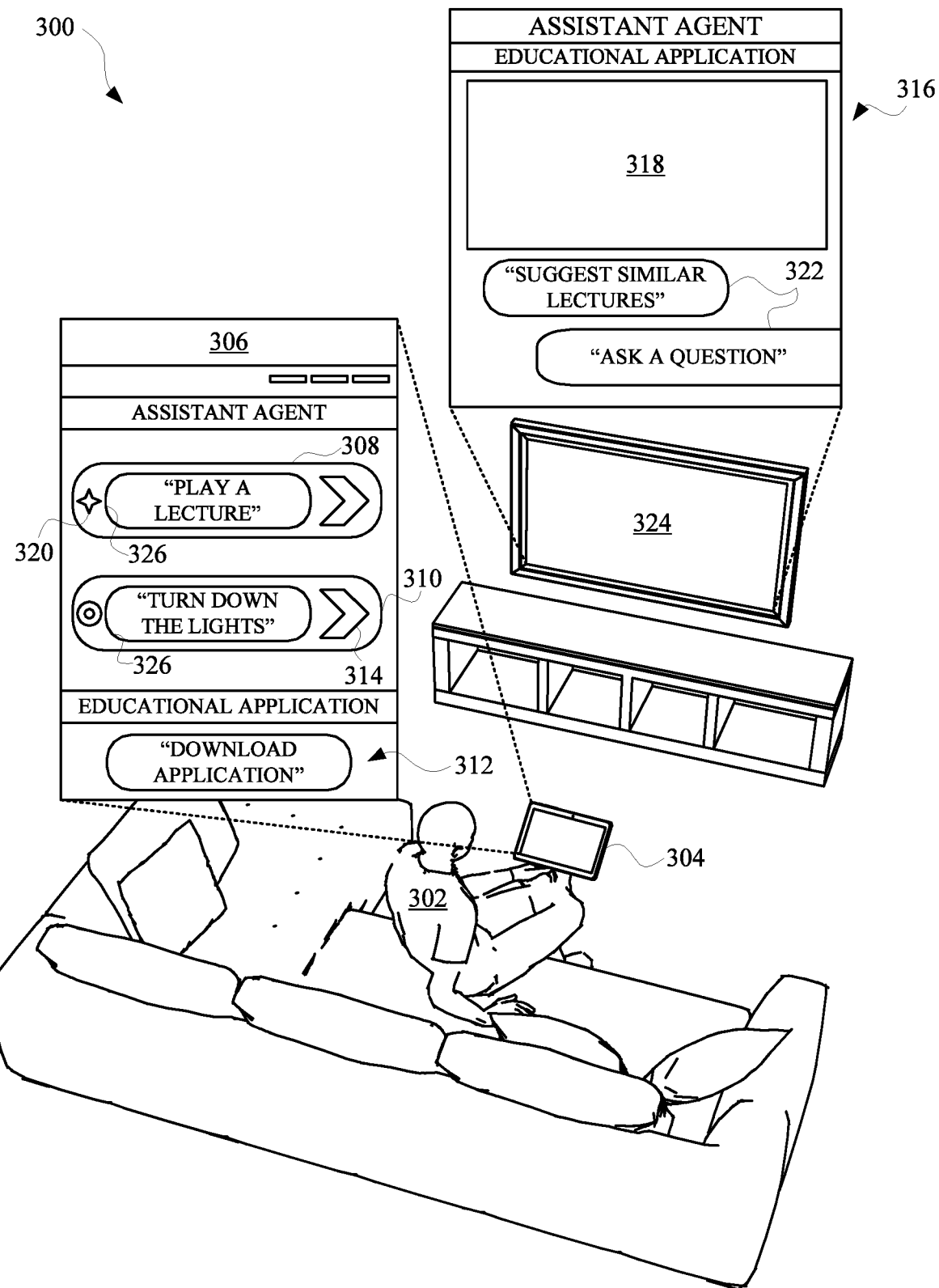
FIG. 3 provides a diagram of a user accessing an assistant agent to provide various selectable elements and for operating different applications accessible to the assistant agent and/or a computing device.

FIG. 3 provides a diagram 300 of a user 302 accessing an assistant agent to provide various selectable elements 308 and 310 for operating different applications accessible to the assistant agent and/or a computing device 304. Specifically, the user 302 can access the assistant agent through a computing device 304, which can display a homepage or landing page of the assistant agent at a first user interface 306. Specifically, the first user interface 306 of the computing device 304 can provide selectable elements 308 and 310, generated by an assistant application corresponding to the assistant agent or by a selectable element engine. Each of the selectable elements can include an identifier 320 that identifies an application to which a respective selectable element corresponds to. Additionally, each selectable element can include a first selectable portion 326 and a second selectable portion 314.

When the first selectable portion 326 of the selectable element 308 is selected by the user 302, the assistant agent can interact with an application corresponding to the selectable element 308. The application can be an educational application that is interactive and provides lectures for the user 302 to watch. In some implementations, the educational application may not be installed at the computing device 304 but, rather, that assistant agent can cause a lite version to be presented to the user 302 when the user selects the first selectable portion 326. In response to the selection of the first selectable portion 326, the command "play a lecture" can be executed by the assistant agent in order that the assistant agent can cause the educational application to open a lecture video at a device associated with the user. For instance, the device can include a television 324, which is separate from the computing device 304.

In some implementations, in response to the user 302 selecting the first selectable portion 326, a separate interface 312 can open at the computing device 304 to provide additional information about the educational application. The separate interface 312 can be presented at the computing device 304 simultaneous to the television 324 displaying the educational application. In this way, the user 302 is able to use the application while also learning additional functionalities of the application. In some implementations, the application provided in response to the selection of the first selectable portion 326 can be presented in an interface 316 of a separate device, such as the television 324. Additionally, the assistant agent can simultaneously provide suggestions for other commands 322 that can be employed through the assistant agent to interact with the application. The other commands can correspond to actions that can be performed by the application through the computing device 304 and/or the separate device. For instance, the assistant agent can perform a query to identify commands that can be received by the application through both the computing device 304 and the separate device (e.g., the television 324). Commands identified as a result of the query can thereafter be presented at either the computing device 304, the separate device, and/or both devices. For instance, one of the other commands can include the phrase "ask a question," which when spoken by the user can cause a dialog to open for receiving questions from the user 302 while operating the educational application.

While the application is being presented at the separate device, the user 302 can select the second selectable portion 314 of the selectable element 308 to cause additional information about the application to appear at the separate interface 312. For instance, the separate interface 312 can include a link for downloading a full version of the application, rather than relying on a version that is being accessed through the assistant agent. Alternatively, the separate interface 312 can provide a most reliable command that is associated with the application corresponding to the selectable element 308. For instance, the assistant agent or assistant application can perform a query to identify common commands that are used by different users of the application (e.g., the educational application) and present the most common commands at the separate interface 312 and/or the separate device.

Figure 4:
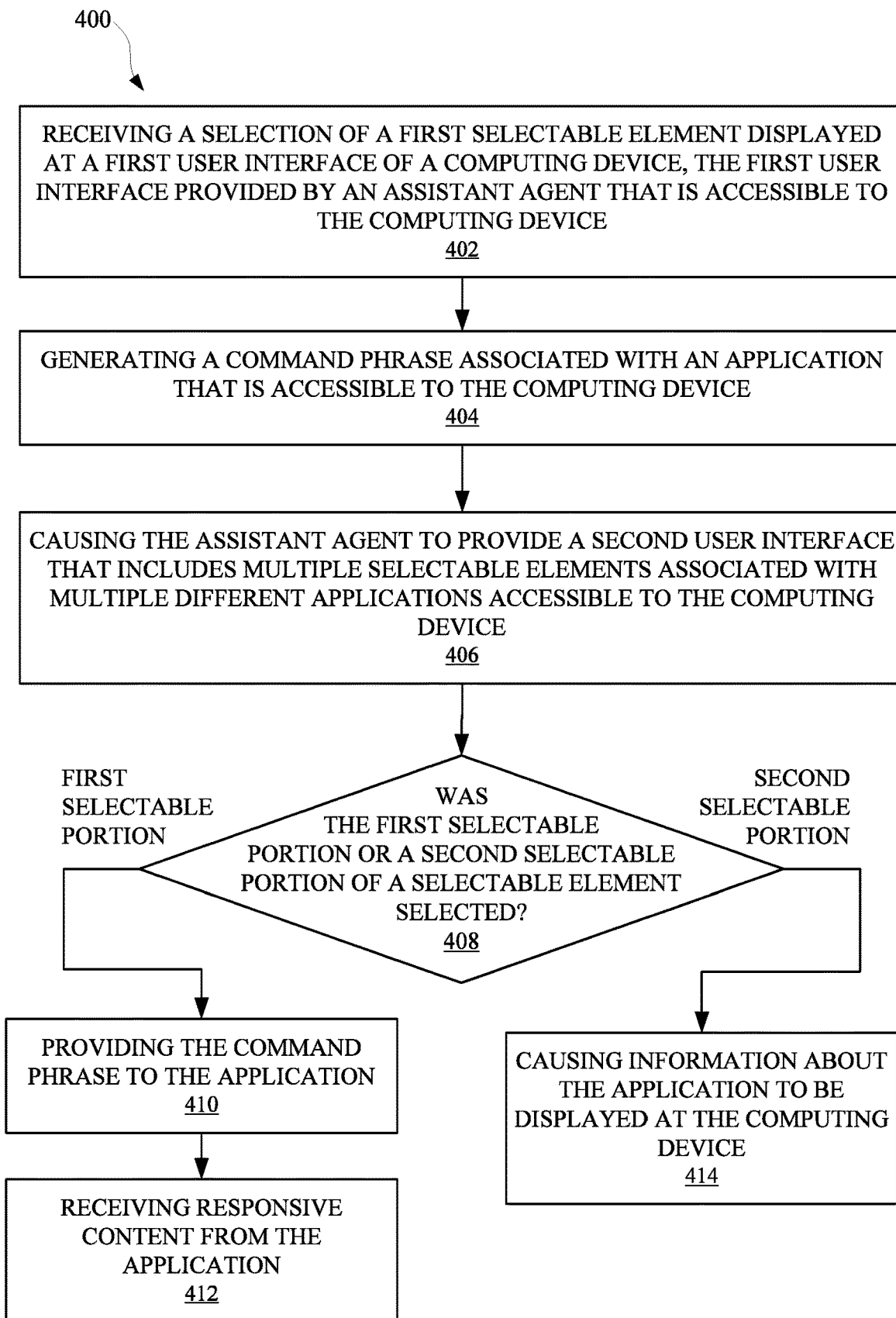
FIG. 4 illustrates a method for more effectively allowing a user of a computing device to interact with applications available through the computing device.

FIG. 4 illustrates a method 400 for more effectively allowing a user of a computing device to interact with applications available through the computing device. The method 400 can be performed by one or more computing devices, and/or any other apparatus capable of interacting with an assistant agent. The assistant agent can be an application that is hosted in whole or part at the computing device and/or a server device. The method 400 can include a block 402 of receiving a selection of a first selectable element displayed at a first user interface of the computing device. The first user interface can be provided by an assistant agent that is accessible to the computing device. For instance, the first user interface can correspond to a landing page or home screen for interacting with the assistant agent. The first user interface can include a dialog element (e.g., a text field or microphone icon) that indicates the assistant agent is capable of receiving textual, verbal, and/or other gestures for controlling the assistant agent. Furthermore, the first selectable element can correspond to a link to a separate user interface that provides information related to multiple different applications accessible to the computing device. For instance, the computing device can access or include a music application configured to stream music downloaded from the internet. Alternatively, the computing device can access or include an internet of things (IoT) application for controlling IoT devices in a home of a user.

The method 400 at block 404 can include generating a command phrase associated with an application that is accessible to the computing device. The command phrase can be a speakable command that, when spoken by a user to an assistant interface (e.g., a microphone of the computing device), causes the assistant agent to interact with the application. For instance, when the application is a music application, the command phrase can be a speakable command such as, "Assistant, please play my favorite song." The command phrase can cause the assistant agent to invoke the music application to identify a favorite song of the user using historical data corresponding to interactions between the user and the music application.

The method 400 can further include a block 406 of causing the assistant agent to provide a second user interface that includes multiple selectable elements associated with multiple different applications accessible to the computing device. The second user interface can be provided at the display of the computing device or a separate computing device. A selectable element, of the multiple selectable elements, can be specific to a given application and include a first selectable portion that includes text corresponding to the command phrase for controlling the assistant agent. The selectable element can also include a second selectable portion for accessing additional information associated with the application. The additional information can correspond to links, ratings, reviews, availability, compatibility, and/or any other information that can be helpful for understanding an application.

At block 408 of the method 400, a determination is made whether the first selectable portion or the second selectable portion of the selectable element was selected. A selection can be made by a user through a spoken command (e.g., "Select the left button"), through a gesture (e.g., a pointing motion toward a selectable portion), a touch input, and/or any other user input that can identify a selectable portion. If the first selectable portion is selected, then at block 410, the command phrase is provided to the application and, at block 412, responsive content is received from the application. For instance, when the command phrase corresponds to request to play a favorite song through a music application, then the responsive content can be song data being downloaded from a server device over the internet. The command phrase can be provided to the assistant agent, which can interact with the application in order to accomplish an action (e.g., playing a favorite song) corresponding to the command phrase.

If, at block 408, the second selectable portion is selected, then at block 414, information about the application is displayed at the computing device or a separate device that is accessible to the assistant agent and/or the application. In some implementations, the additional information can include a link for accessing additional commands for controlling the application. Alternatively, the additional information can include a link for installing the application at the computing device or a separate device that is accessible to the assistant agent.

Figure 5:
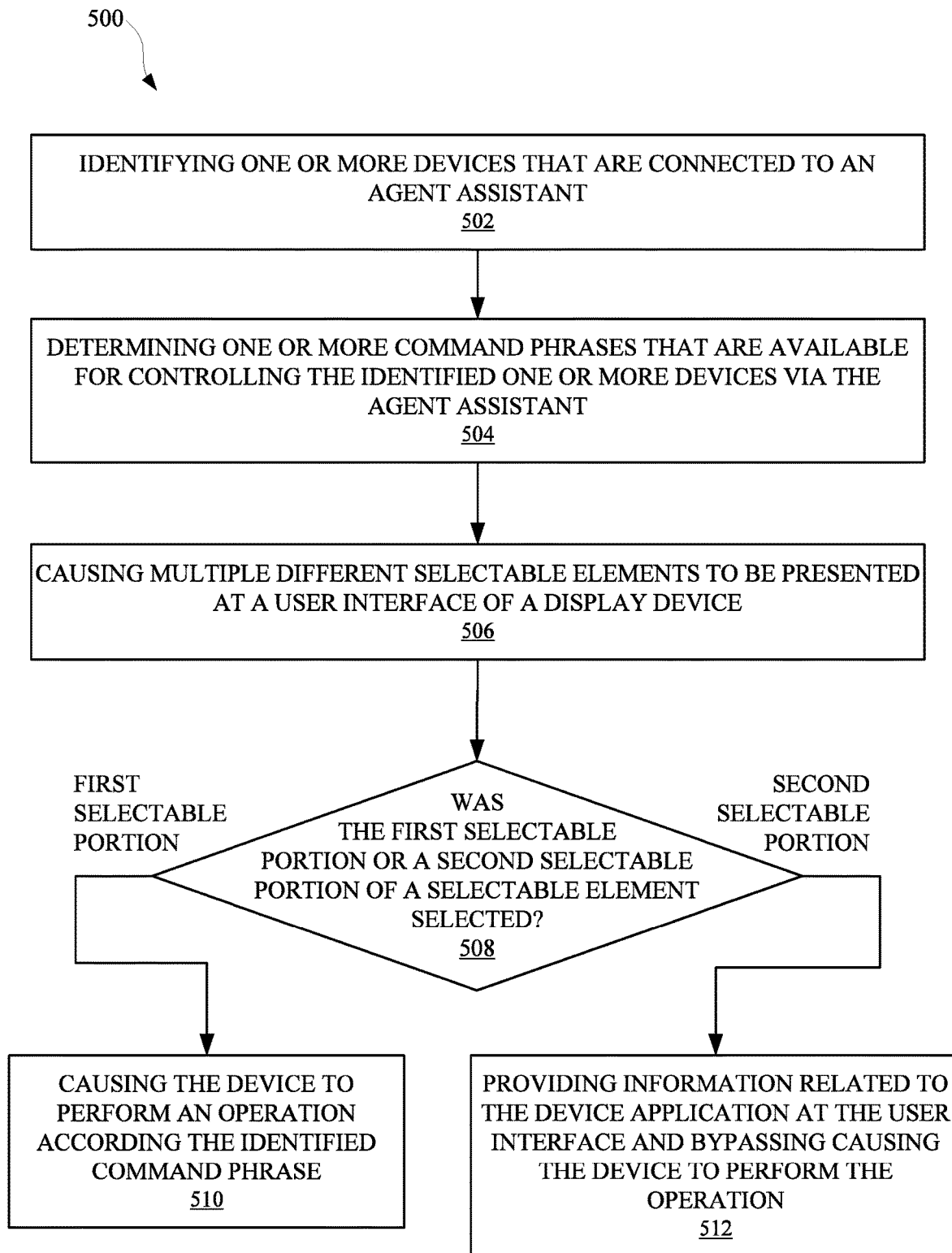
FIG. 5 illustrates a method for controlling a peripheral or remote device according to a command phrase that is suggested to a user based on accessibility of the device to an assistant agent.

FIG. 5 illustrates a method 500 for controlling a peripheral or remote device according to a command phrase that is suggested to a user based on accessibility of the device to an assistant agent. The method 500 can be performed by one or more computing devices, and/or any other apparatus suitable for interacting with an assistant application. The method 500 can include a block 502 of identifying one or more devices that are connected to an assistant agent that is accessible to the one or more processors. The assistant agent can be configured to control one or more settings of the one or more devices. For instance, the assistant agent can receive a command phrase from a user of the assistant agent for controlling various devices and applications accessible to the assistant agent. The devices can include IoT devices that are connected to a home WiFi network available in a home of the user. Furthermore, the computing device with which the user interacts with the assistant agent can be an IoT device that includes a microphone for receiving spoken commands and at least one speaker for providing responses. Furthermore, the IoT devices can include a television, smart lights, robotic devices, a thermostat, an appliance such as a refrigerator or a stove, and/or any other device capable of interacting with a computing device.

The method 500 can further include a block 504 of determining one or more command phrases that are available for controlling the identified one or more devices via the agent assistant. The one or more command phrases, when provided by a user to the assistant agent, can cause the agent assistant to perform one or more actions, such as, for example, initializing a music application to play a favorite song or changing a setting of an IoT device. The one or more command phrases can be determined using data available at a remote device that stores commands for controlling the one or more devices. Alternatively, the assistant agent can access the one or more devices and determine the commands available for controlling the devices by directly or indirectly interfacing with the devices. For instance, the assistant agent can access a device to identify an instructional file or configuration file available at the device in order to compile commands that can be used by the assistant agent to control the device. In some implementations, the commands can be available from an entity (e.g., a third party website or agent) that is responsible for promoting the device, and can therefore recommend commands that are most convenient and/or reliable for a user to effectuate.

The method 500 can also include a block 506 of causing multiple different selectable elements to be presented at a user interface of a display device of the computing device. Each of the selectable elements can be individually associated with different applications or devices. Furthermore, each selectable element of the different selectable elements can include a first selectable portion and a second selectable portion. In some implementations, the first selectable portion of a selectable element can include text that is associated with a command for controlling a device that is paired with, in communication with, or otherwise accessible to the assistant agent. For instance, the device can be an IoT device that can include a music application, and the text can include the command phrase, "Play my favorite song." Furthermore, the selectable element can identify the music application and/or the IoT device, thereby putting the user on notice that their selection of the selectable element will invoke a response or action at the IoT device and/or the music application.

The method 500 can include a block 508 of determining whether the first selectable portion or the second selectable portion of the selectable element was selected. If the first selectable portion of the selectable element was selected, then the method 500 can proceed to block 510, which includes causing the device to perform an operation according to the identified command phrase. For instance, when the device is an IoT device that includes the music application, that assistant agent can determine that the first selectable portion was selected and provide one or more commands to the music application. The commands can cause the music application to perform the operation identified by or associated with the command phrase of the first selectable portion. For example, the assistant agent can cause the music application to play a favorite song of the user from an output device (e.g., a speaker) of the IoT device.

When the user selects the second selectable portion of the selectable element, the method 500 can proceed to block 512, which includes providing information related to the device application at the user interface and bypassing causing the device to perform the operation. By providing the information related to the device application, without causing the device to perform the operation, the user can engage with the device application without invoking the device application. Rather, the user can be provided further information in order to make a more informed decision about the operations the device application can perform. In some implementations, the provided information can include additional selectable elements corresponding to different commands. The commands identified in the provided information can be invoked by selecting the additional selectable elements. This allows the user to control the device or device application through the assistant agent by merely navigating an informational page about the device application.

Figure 6:
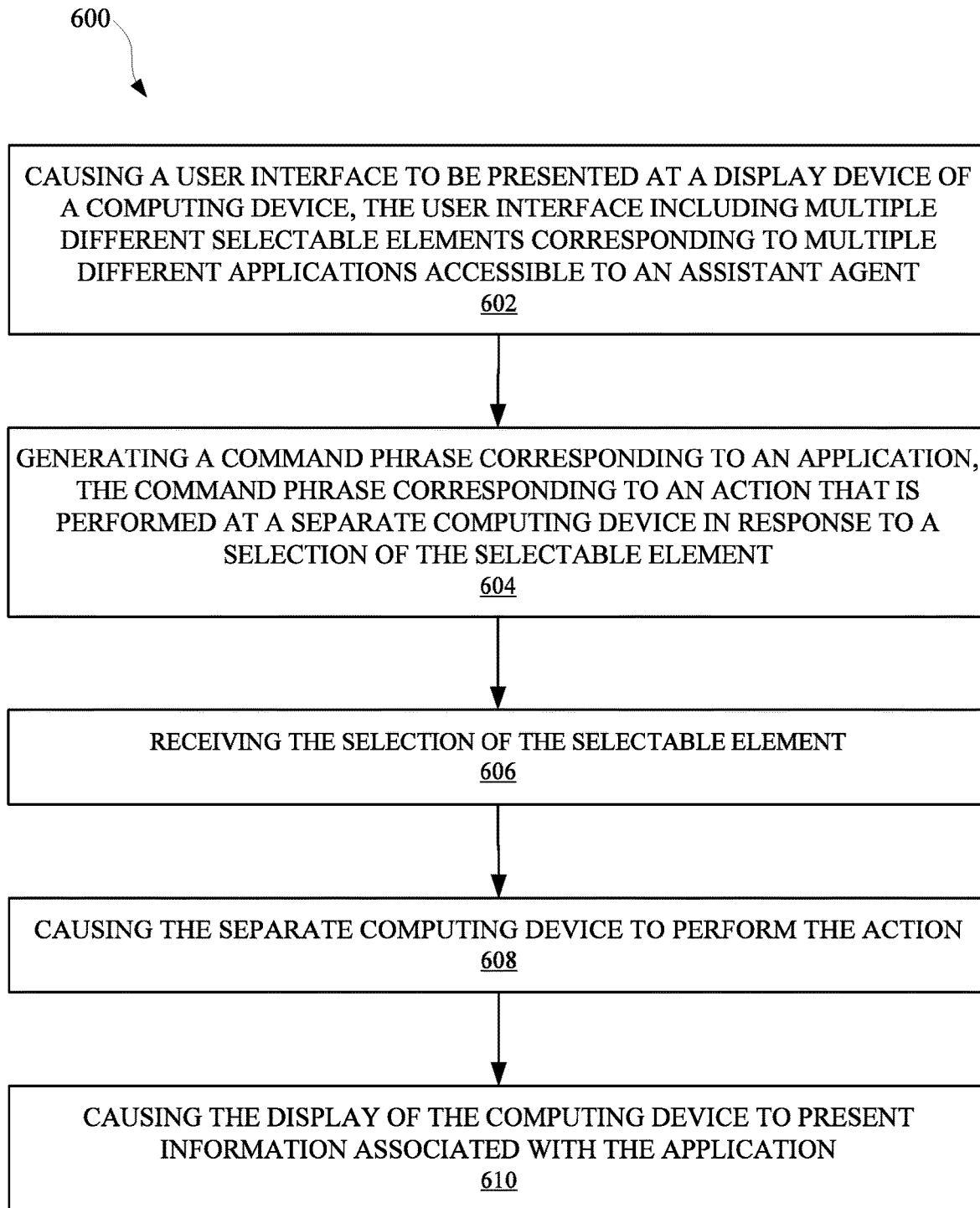
FIG. 6 illustrates a method for controlling an application at a separate computing device while being provided additional information about the application at a different computing device.

FIG. 6 illustrates a method 600 for controlling an application at a separate computing device while being provided additional information about the application at a different computing device. The method 600 can be performed by one or more computing devices, and/or any other apparatus suitable for interacting with an assistant application. The method 600 can include a block 602 of causing a user interface to be presented at a display device of a computing device. The user interface can include multiple different selectable elements corresponding to multiple different applications accessible to an assistant agent. The assistant agent can be an application that is provided at the computing device or otherwise accessible at the computing device over a network connection (e.g., over the internet). A selectable element of the multiple different selectable elements can identify an application of the multiple different applications and include a selectable portion. For instance, the application can be a streaming application that is capable of streaming content from the internet at different devices. The content can include movies, shows, and/or music, and the assistant agent can control the content being streamed in response to commands received from a user. Other applications corresponding to the multiple different applications can include gaming applications, IoT related applications, social networking applications, productivity applications, and/or any other applications that can be accessible to a computing device.

The method 600 can further include a block 604 of generating a command phrase for controlling the application. The command phrase can correspond to an action that is performed at a separate computing device in response to a selection of the selectable element. For example, the action can be to initialize a dialog interface at the separate computing device. The dialog interface can be a medium through which a user can provide command phrases to the assistant agent to cause the assistant agent to control the application. The dialog interface can include a field for inputting textual commands to the assistant agent. For instance, the user can speak a command into an assistant interface (e.g., a microphone) at the computing device and cause the command to be provided in text at the field of the dialog interface.

The method 600 can further include a block 606 of receiving a selection of the selectable element. The selection can be made through a touch interface provided at the display device of the computing device. Alternatively, the selection of the selectable element can be made by speaking a command (e.g., "Assistant, perform an operation with the application" or "Assistant, select the link corresponding to the application) to the assistant interface of the computing device. In some implementations, the assistant interface can be provided at the separate computing device and/or the computing device that is displaying the selectable element.

The method 600 can further include a block 608 of causing the separate computing device to perform the action. The separate computing device can be, for example, a television that is connected to a Wifi network to which the computing device is also connected. Furthermore, the action can be to cause the television to turn on and present a streaming application that provides digital content downloaded from the internet. Furthermore, method 600 at block 610 can include causing the display device of the computing device to present information associated with the application. The information can include a supplemental command phrase that corresponds to a different action that can be performed by the application at the separate computing device. For instance, the different action can correspond to a search function of the streaming application, and the supplemental command phrase can be "Search for popular comedy movies." In this way, the assistant agent is able to employ multiple different devices for teaching a user how to use an application. Moreover, this can preserve computational resources of single device, as the action performance and presentation of information are handled simultaneously at different devices.

Figure 7:
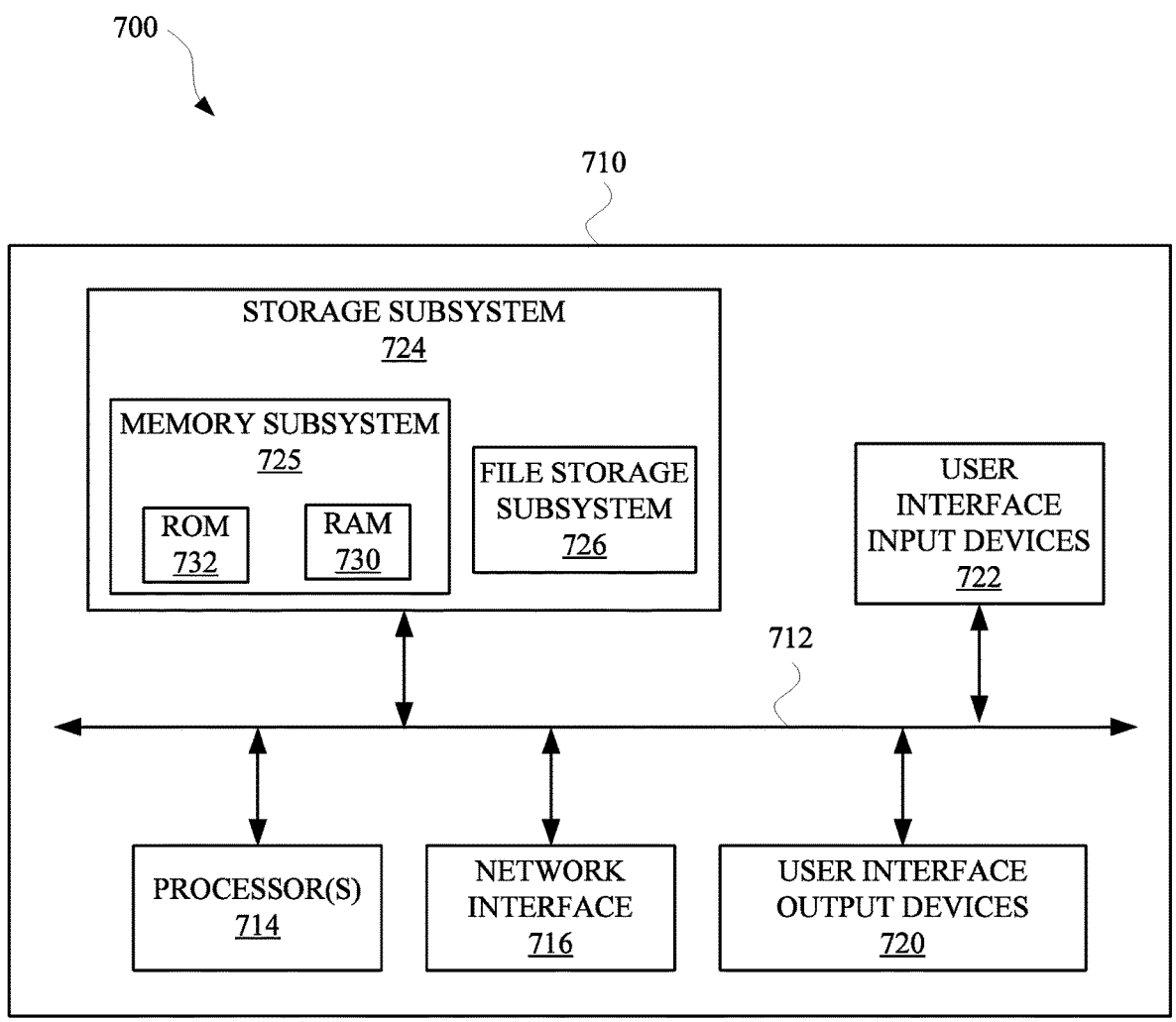
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500, method 600, and/or computing device 102, server device 112, remote devices, IoT devices, and/or any other device or apparatus discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   identifying a selectable element which includes at least a natural language command phrase portion for controlling one or more separate computing devices via an automated assistant;
   rendering, for a user, the selectable element via a user interface of a computing device;
   receiving a selection of the selectable element by the user; and
   in response to receiving the selection of the selectable element by the user:
      identifying a user account corresponding to the user;
      determining, based on the user account, whether one or more particular computing devices of the one or more separate computing devices, are linked with the user account;
      in response to determining the one or more particular devices are linked with the user account, causing the automated assistant to initialize performance of the natural language command phrase portion of the selectable element at the one or more particular computing devices.

2. The method of claim 1, wherein the selectable element identifies at least one of the one or more separate computing devices, and wherein the natural language command phrase portion is an automated assistant command phrase for controlling the identified at least one of the one or more separate computing devices.

3. The method of claim 1, wherein receiving the selection of the selectable element by the user comprises:
   receiving, from the user, a touch input via a display panel of the computing device, wherein the touch input indicates selection of the selectable element.

4. The method of claim 1, wherein the one or more particular computing devices are linked with the computing device via a local area network.

5. The method of claim 1, wherein the selectable element includes (a) the natural language command phrase portion and (b) an additional portion for accessing additional information which includes one or more additional natural language command phrases for controlling the one or more separate computing devices.

6. A system, comprising:
one or more processors:
memory configured to store instructions that, when executed by the one or more processors, cause the one or more processors to perform operations that include:
identifying a selectable element which includes at least a natural language command phrase portion for controlling one or more separate computing devices via an automated assistant;
rendering, for a user, the selectable element via a user interface of a computing device;
receiving a selection of the selectable element by the user; and
in response to receiving the selection of the selectable element by the user:
identifying a user account corresponding to the user;
determining, based on the user account, whether one or more particular computing devices of the one or more separate computing devices, are linked with the user account;
in response to determining the one or more particular devices are linked with the user account, causing the automated assistant to initialize performance of the natural language command phrase portion of the selectable element at the one or more particular computing devices.

7. The system of claim 6, wherein the selectable element identifies at least one of the one or more separate computing devices, and wherein the natural language command phrase portion is an automated assistant command phrase for controlling the identified at least one of the one or more separate computing devices.

8. The system of claim 6, wherein receiving the selection of the selectable element by the user comprises:
receiving, from the user, a touch input via a display panel of the computing device, wherein the touch input indicates selection of the selectable element.

9. The system of claim 6, wherein the one or more particular computing devices are linked with the computing device via a local area network.

10. The system of claim 6, wherein the selectable element includes (a) the natural language command phrase portion and (b) an additional portion for accessing additional information which includes one or more additional natural language command phrases for controlling the one or more separate computing devices.

11. A non-transitory computer readable medium configured to store instructions that, when executed by one or more processors, cause the one or more processors to perform operations that include:
identifying a selectable element which includes at least a natural language command phrase portion for controlling one or more separate computing devices via an automated assistant;
rendering, for a user, the selectable element via a user interface of a computing device;
receiving a selection of the selectable element by the user; and
in response to receiving the selection of the selectable element by the user:
identifying a user account corresponding to the user;
determining, based on the user account, whether one or more particular computing devices of the one or more separate computing devices, are linked with the user account;
in response to determining the one or more particular devices are linked with the user account, causing the automated assistant to initialize performance of the natural language command phrase portion of the selectable element at the one or more particular computing devices.

12. The non-transitory computer readable medium of claim 11, wherein the selectable element identifies at least one of the one or more separate computing devices, and wherein the natural language command phrase portion is an automated assistant command phrase for controlling the identified at least one of the one or more separate computing devices.

13. The non-transitory computer readable medium of claim 11, wherein receiving the selection of the selectable element by the user comprises:
receiving, from the user, a touch input via a display panel of the computing device, wherein the touch input indicates selection of the selectable element.

14. The non-transitory computer readable medium of claim 11, wherein the one or more particular computing devices are linked with the computing device via a local area network.

15. The non-transitory computer readable medium of claim 11, wherein the selectable element includes (a) the natural language command phrase portion and (b) an additional portion for accessing additional information which includes one or more additional natural language command phrases for controlling the one or more separate computing devices.

* * * * *